Patented Oct. 8, 1940

2,217,057

UNITED STATES PATENT OFFICE 2,217,057

PROCESS FOR THE SYNTHESIS OF ARTIFICIAL RUBBER OR RUBBERLIKE COMPOUNDS

Herman B. Kipper, Accord, Mass.

No Drawing. Application November 23, 1938, Serial No. 242,041

2 Claims. (Cl. 260—92)

By polymerization of olefines at low temperatures with the aid of hydrolyzing metal chlorides, tin chloride, antimony chloride, etc., as well as with metal fluorides, oils of very high molecular weights have been synthesized. With the employment of butylene and boron fluoride and low temperatures produced by liquid air or nitrogen, compounds resembling rubber are produced. The latter compounds are, however, saturated: that is, they do not lend themselves to vulcanization with sulphur or molding during such procedure.

Employing processing somewhat similar to that just noted applicant has synthesized an artificial rubber far more closely resembling the natural product and one capable of vulcanization, etc., and hence offering for commercial usage the advantages of the natural product.

A steel tube two and three-eighths inches outside diameter and one and one-half inches inside diameter was filled with butylene under sufficient pressure to produce the liquid state and then cooled by "dry ice," solid carbon dioxide, to about minus fifty degrees centigrade. The contents of the tube, or the butylenes, liquid at atmospheric pressure and at the above noted temperature, were then run into a double walled glass flask, with vacuum existing between the walls, or the so-called "Dewar flask," also containing some "dry ice." Cuprene, from five to twenty percent, for instance in one run or experiment, fifteen grams were used to about two hundred grams of the butylenes, were then mixed with the liquid butylenes and under stirring gaseous boron trifluoride was passed into the mass until a small percentage had been absorbed, possibly two to three percent. The boron trifluoride used was measured by a reduction in gauge pressure in the vessel from which it was passed into the liquid butylene, but just what percentage escaped into the atmosphere was undetermined. The liquid butylenes with suspended cuprene, but without the small pieces of "dry ice," were then poured into another container partially filled with liquid nitrogen. Solidification rapidly occurred. The solidified mass was allowed to stand for some six hours at the low temperature produced by the liquid nitrogen. The product was finally treated with anhydrous ammonia while still at the low temperature and subsequently, after allowing to warm, with anhydrous ammonia under kneading and finally washed with water. A good rubberlike product was thereby produced.

The above experiment was repeated with the exception that a small percentage of copper chlorides, about one-quarter of one percent cuprous and one-quarter percent cupric, were added to and thoroughly mixed with the liquefied butylene-cuprene mass. An even better polymerization occurred than in the above described experiment, and the elasticity of the synthetic or rubberlike product was enhanced.

Butylene gas was also liquefied and cooled with "dry ice," as already noted, mixed with the cuprene, and further cooled by pouring into liquid nitrogen and then treated with boron trifluoride. The liquefied butylene-cuprene mass solidifies and sinks however in the liquid nitrogen. Hence homogenous treatment with the boron trifluoride is rendered uncertain and difficult. Nevertheless, reasonably good products were synthesized in this manner. Also a thin metal container was floated on the liquid nitrogen, contained in a so-called "Dewar flask," and the butylene-cuprene mixture, cooled with "dry ice" was then poured into this container and treated with boron trifluoride and copper chlorides and retained at the low temperature until evaporation of the liquid nitrogen had occurred, some ten to twelve hours, and finally treated with anhydrous ammonia and washed with water in the manner already noted. A good rubberlike product was also formed in this manner, but the best method of operation is that first described when the treatment with boron trifluoride and copper chlorides is carried out with the butylenes in the liquid state and at a temperature produced by "dry ice" and the reaction mass then quickly cooled to produce solidification at the temperature of liquid nitrogen.

The cuprene was produced from acetylene, mixed with about forty percent of nitrogen to reduce the explosive nature of the acetylene, by passing the gas mixture at about two hundred and twenty-five degrees centigrade over a fine meshed copper screen contained in a heavy walled metal tube. The cuprene can be readily separated from the copper gauze and in this manner a product practically free from copper is secured. The commonly employed or described method of passing acetylene over finely divided copper produces contamination of the cuprene with copper. The cuprene was ground to a very finely divided product. The grinding operation employed was similar to that used for the production of a micron-sized product from limestone, so that probably from this very much softer material extremely fine particles were produced.

The synthetic rubberlike compound can be vulcanized to give both soft and hard products. Vulcanization with sulphur was carried out at between one hundred and twenty-five and one hundred and fifty degrees C. under about one hundred pounds pressure produced by nitrogen gas. A small percentage of piperidine, about one-half to one percent, and about half that percentage of thiocarbamid were used as catalysts or accelerators for the vulcanization. With forty percent of sulphur a good hard rubber plastic was produced. Vulcanization with sulphur chloride was carried out at atmospheric temperatures, with the addition of the sulphur chloride during kneading, extended over about an hour period. Fifteen to twenty percent of the sulphur monochloride gave a soft excellent elastic product and about fifty to sixty percent gave a hard rubber. The latter product can be molded, for instance at one hundred and fifty to two hundred degrees C.

When using acetylene in place of cuprene the liquid butylenes, contained in a steel tube, were first cooled to about the temperature of "dry ice," in the manner already noted, and then acetylene forced into the tube, which also contained a small percentage, about one percent, of copper chlorides. At the low temperature the acetylene is dissolved and shows only a relatively low vapor tension. Application used from five to ten percent of acetylene on weight of butylenes. A small percentage of boron trifluoride was then run into the tube. Such step cannot be carried out too rapidly or the acetylene is driven out of solution at the "dry ice" temperature. The latter will redissolve, however, if sufficient time is given. Applicant, to reduce the time factor, cooled the tube somewhat further by pouring liquid nitrogen over it. The tube was simultaneously well shaken to produce homogeneity of the catalyzed mass and then immersed in liquid nitrogen and allowed to stand for about five hours at the low temperature thereby produced. The tube must not be allowed to warm under pressure, as otherwise the boron trifluoride produces depolymerization. The tube used was about ten inches long and one inch inside diameter, made of steel.

Products similar to those produced when using cuprene with the butylenes were secured, although somewhat lighter in color.

Naturally, higher or lower percentages of cuprene or of acetylene might be employed. Liquid air, of course, might be used for liquid nitrogen in the indirect cooling operations, but the general factor of safety is certainly enhanced when using liquid nitrogen in conjunction with the unsaturated organic compounds.

Applicant has described similar work in his application Serial No. 229,674 September 13, 1938, when using tin, antimony, copper and aluminum chloride and the work therein described was pretty successful, especially when using certain combinations of these catalysts, more especially such combinations in which copper chlorides were used, but boron trifluoride certainly represents the ideal catalyst for the work in question and the present operations represent steps far superior to his earlier one. The former catalysts were freed with difficulty from the products synthesized.

I claim:

1. In a process for the production of an artificial rubber, the step of reacting and polymerizing olefinic gases, consisting of a mixture of butylene hydrocarbons, and acetylene at low temperatures, below minus eighty degrees centigrade, with borontrifluoride and copper chlorides.

2. In a process for the production of an artificial rubber, the step of reacting and polymerizing olefinic gases, consisting of a mixture of butylene hydrocarbons, and acetylene first liquefied at about the temperature of solid carbon dioxide, with the solution under superatmospheric pressure due to vapor tension of acetylene dissolved in the said liquid butylene, by treatment of this solution with borontrifluoride and cupric chloride in small percentages as polymerizing catalyst and catalytic activator, with agitation of the said mass and finally quickly cooling the same to about the temperature of liquid nitrogen.

HERMAN B. KIPPER.